(12) United States Patent
Kim et al.

(10) Patent No.: US 12,548,776 B2
(45) Date of Patent: Feb. 10, 2026

(54) BINDER FOR ANODE OF SECONDARY BATTERY, ANODE OF SECONDARY BATTERY AND SECONDARY BATTERY

(71) Applicant: LG Chem, Ltd., Seoul (KR)

(72) Inventors: Doyun Kim, Daejeon (KR); Jung Sup Han, Daejeon (KR); Min Ah Kang, Daejeon (KR); Cheolhoon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 524 days.

(21) Appl. No.: 18/032,698

(22) PCT Filed: Oct. 20, 2021

(86) PCT No.: PCT/KR2021/014716
§ 371 (c)(1),
(2) Date: Apr. 19, 2023

(87) PCT Pub. No.: WO2022/086173
PCT Pub. Date: Apr. 28, 2022

(65) Prior Publication Data
US 2023/0387415 A1  Nov. 30, 2023

(30) Foreign Application Priority Data

Oct. 23, 2020 (KR) .................. 10-2020-0138513

(51) Int. Cl.
*H01M 10/0525* (2010.01)
*H01M 4/04* (2006.01)
*H01M 4/62* (2006.01)
*H01M 4/02* (2006.01)

(52) U.S. Cl.
CPC ......... *H01M 4/622* (2013.01); *H01M 4/0404* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 2007/0091544 A1 | 4/2007 | Terada et al. |
| 2015/0132644 A1 | 5/2015 | Sonobe et al. |
| 2015/0287994 A1 | 10/2015 | Wu et al. |
| 2016/0156038 A1 | 6/2016 | Park et al. |
| 2017/0256800 A1 | 9/2017 | Kaneda et al. |
| 2020/0399458 A1 | 12/2020 | Akabane et al. |

FOREIGN PATENT DOCUMENTS

| | | |
|---|---|---|
| JP | 2013182765 A | 9/2013 |
| JP | 2015201444 A | 11/2015 |
| JP | 6151477 B2 | 6/2017 |
| KR | 20060105034 A | 10/2006 |
| KR | 20080034218 A | 4/2008 |
| KR | 20140138057 A | 12/2014 |
| KR | 101597745 B1 | 2/2016 |
| KR | 101683723 B1 | 12/2016 |
| KR | 101698745 B1 | 1/2017 |
| KR | 20170053615 A | 5/2017 |
| WO | 2013183717 A1 | 12/2013 |
| WO | 2019172281 A1 | 9/2019 |

OTHER PUBLICATIONS

International Application No. PCT/KR2021/014716, mailed Feb. 3, 2022.

*Primary Examiner* — Carlos Barcena
(74) *Attorney, Agent, or Firm* — Lerner David LLP

(57) ABSTRACT

The present disclosure relates to a binder for an anode of a secondary battery, an anode for a secondary battery and a secondary battery, wherein the binder comprises a binder particle comprises a copolymer core particle containing a repeating unit derived from an isoprene-based monomer; and a copolymer shell located on the surface of the core particle and containing a repeating unit derived from a butadiene-based monomer. Specifically, the present disclosure is for the purpose of improving the binder applied to the anode of the secondary battery, thereby minimizing the change in volume of the anode and the secondary battery and minimizing the decrease in capacity while increasing the energy density.

20 Claims, No Drawings

BINDER FOR ANODE OF SECONDARY BATTERY, ANODE OF SECONDARY BATTERY AND SECONDARY BATTERY

CROSS-REFERENCE TO RELATED APPLICATION(S)

This application is a national stage entry under 35 U.S.C. § 371 of International Application No. PCT/KR2021/014716 filed on Oct. 20, 2021, which claims the priority from Korean Patent Application No. 10-2020-0138513 filed on Oct. 23, 2020, the disclosures of which are incorporated herein by reference in their entirety.

TECHNICAL FIELD

The present disclosure relates to a binder for an anode of a secondary battery, an anode for a secondary battery and a secondary battery.

BACKGROUND ART

The field of application of secondary batteries is enlarging not only to portable electronic devices but also to medium and large-sized devices such as hybrid vehicles and electric vehicles.

The anode of the secondary battery includes a current collector and an anode active material layer, wherein the anode active material layer includes an anode active material and a binder.

Specifically, various types of carbon-based materials including artificial graphite, natural graphite and hard carbon capable of intercalation/deintercalation of lithium have been applied as anode active materials, and in order to increase the discharge capacity, the use of silicon, tin, silicon-tin alloy, and the like as an anode active material is also being studied.

However, the secondary battery has a problem that stability and lifespan decrease as the charge and discharge are repeated. Specifically, the volume of the anode active material is expanded and contracted according to repeated charge and discharge of the secondary battery, and the binding force of the binder that binds the anode active material and the current collector in this process may deteriorate. Such a problem becomes more serious as the discharge capacity of the anode active material becomes larger.

Further, in the secondary battery, the binder for anode can be expanded according to the impregnation of the electrolyte solution, which may also reduce the binding force of the binder.

Therefore, in order to realize a secondary battery with high capacity, high performance and long life, there is a need to minimize the change in volume of the anode and the secondary battery.

DETAILED DESCRIPTION OF THE INVENTION

Technical Problem

It is one object of the present disclosure to improve the binder applied to the anode of the secondary battery, thereby minimizing the change in volume of the anode and the secondary battery and minimizing the decrease in capacity while increasing the energy density.

Technical Solution

Specifically, in an embodiment of the present disclosure, there is provided a binder for an anode of a secondary battery, comprising a binder particle having an isoprene-based core and butadiene-based shell structure.

In another embodiment of the present disclosure, there is provided a method for preparing a binder for an anode of a secondary battery, comprising synthesizing an isoprene-based core and then forming a butadiene-based shell by a continuous process.

In further embodiments of the present disclosure, there are provided an anode mixture, an anode, and a secondary battery comprising the binder for an anode according to the above-mentioned one embodiment.

Advantageous Effects

The binder for an anode of the one embodiment includes not only an isoprene-based core that has a low electrolyte solution impregnation rate, thus suppresses volume expansion, and can improve the life of a secondary battery, but also a butadiene-based shell that has excellent adhesive strength and thus can maintain the binding force between the anode active material and the current collector even by repeated charge and discharge, thereby being able to ultimately secure the stability and life of the secondary battery.

DETAILED DESCRIPTION OF THE EMBODIMENTS

The terms "first," "second," etc. are used to explain various elements, and these terms are only used to distinguish one constitutional element from the other constitutional elements.

Further, the technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Further, as used herein, in case a layer or an element is mentioned to be formed "on" layers or elements, it means that the layer or element is directly formed on the layers or elements, or it means that other layers or elements may be additionally formed between the layers, on a subject, or on a substrate.

Unless otherwise defined herein, the "copolymerization" may mean block copolymerization, random copolymerization, graft copolymerization, or alternating copolymerization, and the "copolymer" may mean block copolymer, random copolymer, graft copolymer or alternating copolymer.

Although the present disclosure may have various forms and various modifications can be made thereto, specific examples will be exemplified and explained in detail. However, it is not intended to limit the present disclosure to disclosed forms, and it should be understood that all the modifications, equivalents or substitutions within the idea and technical scope of the present disclosure are included in the present disclosure.

Binder for Anode of Secondary Battery

In one embodiment of the present disclosure, there is provided a binder for an anode of a secondary battery comprising a binder particle having a core-shell structure.

The binder for anode of the one embodiment can take both the advantages due to the core particle and the advantages due to the shell.

Specifically, the binder particle having a core-shell structure comprises a copolymer core particle containing a repeating unit derived from an isoprene-based monomer; and a copolymer shell located on the surface of the core particle and containing a repeating unit derived from a butadiene-based monomer.

This includes not only an isoprene-based core that has a low electrolyte impregnation rate, thus suppresses volume expansion, and can improve the life of a secondary battery, but also a butadiene-based shell that has excellent adhesive strength and thus can maintain the binding force between the anode active material and the current collector even by repeated charge and discharge, thereby being able to ultimately secure the stability and life of the secondary battery.

The binder for the abode of the one embodiment may be composed of only the binder particle having a core-shell structure which is a solid content, or may be implemented in the form of a composition to which an aqueous solvent or the like is added.

Hereinafter, the binder for an anode of the one embodiment will be described in detail.

Core Particle

The core particle may be a copolymer that comprise (a) a first repeating unit derived from an isoprene-based first monomer, (b) a second repeating unit derived from an aromatic vinyl-based second monomer, and (c) a third repeating unit derived from an unsaturated carboxylic acid-based third monomer.

In the core particle, the first repeating unit is derived from an isoprene-based first monomer. Specifically, the first repeating unit corresponds to a structural unit of a copolymer formed from the isoprene-based first monomer supplied at the time of synthesizing the core particle.

When such a first repeating unit is contained in the core particle, the binder including the same can suppress electrolyte solution impregnation and volume expansion, and can improve the life of the secondary battery.

Specifically, the first monomer may be isoprene.

In the core particle, the second repeating unit is derived from an aromatic vinyl-based second monomer. Specifically, the second repeating unit corresponds to a structural unit of a copolymer formed from an aromatic vinyl-based second monomer supplied at the time of synthesizing the core particle.

When such a second repeating unit is contained in the core particle, the binder including the same can improve the strength and the affinity with the electrolyte solution.

Specifically, the aromatic vinyl-based second monomer may be at least one selected from the group consisting of styrene, α-methylstyrene, β-methylstyrene, p-t-butylstyrene, chlorostyrene, vinylbenzoic acid, methyl vinylbenzoate, vinyl naphthalene, chloromethyl styrene, hydroxymethylstyrene and divinylbenzene. For example, it may be styrene.

In the core particle, the third repeating unit is derived from an unsaturated carboxylic acid-based third monomer. Specifically, the third repeating unit corresponds to a structural unit of a copolymer formed from a third monomer supplied at the time of synthesizing the core particle.

When such a third repeating unit is contained in the core particle, the binder including the same can be improved in the strength, polymerization stability and storage stability.

Specifically, the unsaturated carboxylic acid-based third monomer may be at least one selected from the group consisting of acrylic acid, methacrylic acid, maleic acid, fumaric acid, glutaric acid, itaconic acid, tetrahydrophthalic acid, crotonic acid, isocrotonic acid, and nadic acid. For example, it may be acrylic acid and itaconic acid.

The binder for anode may comprise, based on the total weight (100% by weight) of the core particle, (a) 30 to 65% by weight of a first repeating unit derived from an isoprene-based first monomer, (b) 30 to 65% by weight of a second repeating unit derived from an aromatic vinyl-based second monomer, and (c) 0.1 to 10% by weight of a third repeating unit derived from an unsaturated carboxylic acid-based third monomer.

Within such a range, the effects due to the first to third repeating units can be harmonized.

For example, based on the total weight (100% by weight) of the core particle, (a) the first repeating unit derived from an isoprene-based first monomer may be contained in an amount of 30% by weight or more, 32% by weight or more, 34% by weight or more, or 36% by weight or more, and 65% by weight or less, 62% by weight or less, 59% by weight or less, or 56% by weight or less.

Further, based on the total weight (100% by weight) of the core particle, (b) the second repeating unit derived from an aromatic vinyl-based second monomer may be contained in an amount of 30% by weight or more, 32% by weight or more, 34% by weight or more, or 36% by weight or more, and 65% by weight or less, 62% by weight or less, 59% by weight or less, or 56% by weight or less.

Further, based on the total weight (100% by weight) of the core particle, (c) the third repeating unit derived from an unsaturated carboxylic acid-based third monomer may be contained in an amount of 0.1% by weight or more, 0.5% by weight or more, 1% by weight or more, or 3% by weight or more, and 10% by weight or less, 9% by weight or less, 8% by weight or less, or 7% by weight or less.

Shell

The shell may be a copolymer that comprises (d) a fourth repeating unit derived from a butadiene-based fourth monomer, (e) a fifth repeating unit derived from an aromatic vinyl-based fifth monomer, and (f) a sixth repeating unit derived from an unsaturated carboxylic acid-based sixth monomer.

In the shell, the fourth repeating unit is derived from a butadiene-based fourth monomer. Specifically, the fourth repeating unit corresponds to a structural unit of a copolymer formed from an butadiene-based fourth monomer supplied at the time of synthesizing the shell.

When such a fourth repeating unit is contained in the shell, the binder including the same has excellent adhesive strength and thus can maintain the binding force between the anode active material and the current collector even by repeated charge and discharge.

Specifically, the fourth monomer may be 1,3-butadiene.

In the shell, the fifth repeating unit is derived from an aromatic vinyl-based fifth monomer. Specifically, the fifth repeating unit corresponds to a structural unit of a copolymer formed from an aromatic vinyl-based fifth monomer supplied at the time of synthesizing the shell.

When such a fifth repeating unit is contained in the shell, a binder including the same can be improved in the strength and the affinity with the electrolyte solution.

Specifically, the aromatic vinyl-based fifth monomer may be at least one selected from the group consisting of styrene, α-methylstyrene, β-methylstyrene, p-t-butylstyrene, chlorostyrene, vinylbenzoic acid, methyl vinylbenzoate, vinyl naphthalene, chloromethyl styrene, hydroxymethylstyrene and divinylbenzene. For example, it may be styrene.

In the shell, the sixth repeating unit is derived from an unsaturated carboxylic acid-based sixth monomer. Specifically, the sixth repeating unit corresponds to a structural unit of a copolymer formed from a sixth monomer supplied at the time of synthesizing the shell.

When such a sixth repeating unit is contained in the shell, a binder including the same can be improved in the strength, polymerization stability, and storage stability.

Specifically, the unsaturated carboxylic acid-based sixth monomer may be at least one selected from the group consisting of acrylic acid, methacrylic acid, maleic acid, fumaric acid, glutaric acid, itaconic acid, tetrahydrophthalic acid, crotonic acid, isocrotonic acid, and nadic acid. For example, it may be acrylic acid and itaconic acid.

The binder for anode may comprise, based on the total weight (100% by weight) of the shell, (d) 30 to 85% by weight of a fourth repeating unit derived from a butadiene-based fourth monomer, (e) 10 to 65% by weight of a fifth repeating unit derived from an aromatic vinyl-based fifth monomer, and (f) 0.1 to 15% by weight of a sixth repeating unit derived from an unsaturated carboxylic acid-based sixth monomer.

Within such a range, the effects due to the fourth to sixth repeating units can be harmonized.

For example, based on the total weight (100% by weight) of the shell, (d) the fourth repeating unit derived from a butadiene-based fourth monomer may be contained in an amount of 30% by weight or more, 32% by weight or more, 34% by weight or more, or 36% by weight or more, and 85% by weight or less, 82% by weight or less, 78% by weight or less, or 75% by weight or less.

Further, based on the total weight (100% by weight) of the shell, (e) the fifth repeating unit derived from an aromatic vinyl-based fifth monomer may be contained in an amount of 10% by weight or more, 12% by weight or more, 14% by weight or more, or 16% by weight or more, and 65% by weight or less, 62% by weight or less, 59% by weight or less, or 56% by weight or less.

Further, based on the total weight (100% by weight) of the shell, (f) the sixth repeating unit derived from an unsaturated carboxylic acid-based sixth monomer may be contained in an amount of 0.1% by weight or more, 0.5% by weight or more, 1% by weight or more, or 3% by weight or more, and 15% by weight or less, 13% by weight or less, 11% by weight or less, or 9% by weight or less.

Weight Ratio of Core Particle and Shell

In the binder particle having the core-shell structure, the weight ratio of the core particle and the shell (core:shell) may be 1:1 to 15:1, specifically 2:1 to 14:1, more specifically, 3:1 to 13:1, for example, 4:1 to 12:1.

Within such a range, the effect of an isoprene-based core that suppresses the volume expansion and can improve the life of a secondary battery; and the effect of a butadiene-based shell that has excellent adhesive strength and thus can maintain the binding force between the anode active material and the current collector even by repeated charge and discharge, can be harmonized.

Average Particle Size of Binder Particle

Meanwhile, the binder particle having a core-shell structure can be prepared by continuous emulsion polymerization and can have a latex particle shape.

Specifically, the binder particle having the core-shell structure may be a latex particle having an average particle size of 90 to 500 nm.

The average particle size of the latex particle can be measured using a particle size analyzer (NICOMP AW380, manufactured by PSS) using a dynamic light scattering method.

Specifically, as used herein, the 'average particle size' refers to the arithmetic average particle size in the particle size distribution measured by a dynamic light scattering method, wherein the arithmetic mean particle size can be measured as the average particle size of the intensity distribution, the average particle size of the volume distribution, or the average particle size of the number distribution. Of these, it is preferable to measure with as the average particle size of the intensity distribution.

For example, the binder particle having a core-shell structure may be a latex particle having an average particle size of 90 nm or more, 120 nm or more, 150 nm or more, or 170 nm or more, and 500 nm or less, or 400 nm or less, or 300 nm or less, or 200 nm or less.

If the average particle size of the binder particle having the core-shell structure is too small, the viscosity becomes high and the adhesive strength of the mixture layer including the same to the current collector may be weakened. Conversely, if the average particle size of the binder particle having a core-shell structure is too large, the stability of the particle may decrease.

Aqueous Solvent

Further, the binder for the anode of one embodiment further comprises an aqueous solvent, that is, water, together with the binder particle having the core-shell structure, and thus can be implemented in the form of a latex composition.

From the viewpoint of stability and viscosity adjustment of the latex particle (the binder particle having a core-shell structure), the aqueous solvent may be used in an amount of about 50 to about 1,000 parts by weight, specifically about 100 to about 400 parts by weight, based on 100 parts by weight of the binder particle having the core-shell structure. For example, the aqueous solvent may be used so that the total solid content (TSC) is adjusted to about 10 to about 65%, based on the total amount (100% by weight) of the binder for anode of the one embodiment.

When the aqueous solvent is used in an excessively small amount, there may be a problem that the stability of the latex particle (the binder particle having a core-shell structure) is lowered, and when the solvent is used in an excessively large amount, the viscosity may be lowered, the adhesive strength of the binder may be weakened, which may lead to deterioration of the overall performance of the battery.

Method for Manufacturing Binder for Anode of Secondary Battery

In another embodiment of the present disclosure, there is provided a method for preparing a binder for an anode of a secondary battery, comprising synthesizing an isoprene-based core and then forming a butadiene-based shell by a continuous process.

Specifically, the manufacturing method of the one embodiment comprises the steps of: polymerizing a first monomer mixture containing an isoprene-based monomer to prepare a copolymer core particle containing a repeating unit derived from an isoprene-based monomer; and polymerizing a second monomer mixture containing a butadiene-based monomer in the presence of the core particle to form a copolymer shell containing a repeating unit derived from a butadiene-based monomer on the surface of the core particle, thereby being able to obtaining a binder for an anode of the one embodiment described above.

Hereinafter, the manufacturing method of the one embodiment will be described in detail, but descriptions overlapping with the above-mentioned contents will be omitted.

First Monomer Mixture

A copolymer core particle containing a repeating unit derived from an isoprene-based monomer can be prepared by polymerizing the first monomer mixture.

Specifically, the first monomer mixture may include (a) an isoprene-based first monomer, (b) an aromatic vinyl-based second monomer, and (c) an unsaturated carboxylic acid-based third monomer.

The content of each monomer in the first monomer mixture may be the same as the content of each repeating unit in the above-mentioned core particle, and a detailed description thereof will be omitted.

Second Monomer Mixture

A second monomer mixture containing a butadiene-based monomer can be polymerized in the presence of the core particle to form a copolymer shell containing a repeating unit derived from a butadiene-based monomer on the surface of the core particle.

Specifically, the second monomer mixture may comprise (d) a butadiene-based fourth monomer, (e) an aromatic vinyl-based fifth monomer, and (f) an unsaturated carboxylic acid-based sixth monomer.

The content of each monomer in the second monomer mixture may be the same as the content of each repeating unit in the above-mentioned shell, and a detailed description thereof will be omitted.

Emulsion Polymerization

The polymerization of the first monomer mixture and the polymerization of the second monomer mixture can be each independently performed by an emulsion polymerization method.

Specifically, each of the above steps can be performed in the presence of an aqueous solvent, an emulsifier and a polymerization initiator.

Further, even in each step, the emulsion polymerization can be performed by a single polymerization or a multi-stage polymerization. Here, the single polymerization means a method in which the monomers to be used are put into a single reactor and polymerized at the same time, and the multi-stage polymerization means a method of sequentially polymerizing used monomers in two or more stages.

The aqueous solvent is the same as described above and thus, a detailed description thereof is omitted.

The polymerization temperature and polymerization time of the emulsion polymerization for preparing the copolymer may be appropriately determined, if necessary. For example, the polymerization temperature may be from about 50° C. to about 200° C., and the polymerization time may be from about 0.5 hours to about 20 hours.

Polymerization Initiator

An inorganic or organic peroxide can be used as the polymerization initiator usable during the emulsion polymerization. For example, a water-soluble initiator including potassium persulfate, sodium persulfate, ammonium persulfate, and the like, and oil-soluble initiator including cumene hydroperoxide, benzoyl peroxide, and the like can be used.

Activator

Further, an activator may be further contained in order to accelerate the reaction initiation of the peroxide together with the polymerization initiator. As such an activator, at least one selected from the group consisting of sodium formaldehyde sulfoxylate, sodium ethylenediaminetetraacetate, ferrous sulfate, and dextrose can be used.

Emulsifier

As an emulsifier for the emulsion polymerization, anionic emulsifiers, such as sodium dodecyl diphenyl ether disulfonate, sodium lauryl sulfate, sodium dodecyl benzene sulfonate, or dioctyl sodium sulfosuccinate, or nonionic emulsifiers, such as polyoxyethylene lauryl ether, polyethylene oxide alkyl ether, polyethylene oxide alkyl aryl ethers, polyethylene oxide alkyl amine, or polyethylene oxide alkyl ester can be used. Such an emulsifier is a material having both a hydrophilic group and a hydrophobic group at the same time, and forms a micellar structure in the emulsion polymerization process, and polymerization of each monomer can occur inside the micellar structure. Preferably, the anionic emulsifier and the nonionic emulsifier can be used alone or in combination of two or more. It may be more effective when an anionic emulsifier and a nonionic emulsifier are mixed and used, but the present invention is not necessarily limited to the types of the emulsifier.

Further, the emulsifier can be used in an amount of about 0.01 to about 10 parts by weight, about 1 to about 10 parts by weight, or about 3 to about 5 parts by weight, based on 100 parts by weight of the total monomer components used in the preparation of the copolymer.

Anode Mixture and Anode

In another embodiment of the present disclosure, an anode mixture comprising the binder for anode of the above-described embodiment, and an anode active material is provided, and an anode including an anode mixture layer including the above anode mixture and an anode current collector is provided.

Except for the binder for anode of the one embodiment, the anode active material used for the anode mixture and the anode, the anode current collector, and the like can each include generally known components.

Anode Mixture

Among the total weight (100% by weight) of the anode mixture, the solid content of the binder for anode of the one embodiment may be contained in an amount of 1% by weight to 10% by weight, specifically 1% by weight to 5% by weight. When this is satisfied, the content of the anode active material may be relatively increased, and the discharge capacity of the anode can be further improved.

Meanwhile, the binder for anode of the one embodiment has excellent properties in terms of binding force, mechanical properties, and the like, whereby not only when a graphite-based anode material is used as the anode active material of the anode mixture, but also when an anode active material having a higher capacity than that is used, the binding force between the anode active material and the anode active material, between the anode active material and the anode current collector, and the like can be maintained, and the expansion of the anode active material can be suppressed by its own mechanical properties.

Since the binder for anode of one embodiment is suitable to be applied not only to the graphite-based anode active material, but also to the anode active material having a higher capacity than that. Thus, in one embodiment of the present disclosure, the type of the anode active material is not particularly limited, Specifically, the anode active material may include, for example, carbons such as hardly graphitizable carbon and graphite-based carbon, metal composite oxides such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, Group 1, 2, 3 elements in the periodic table, halogen; $0 \leq x \leq 1$; $1 \leq y \leq 3$; $1 \leq z \leq 8$); lithium alloys; silicon-based alloys; tin-based alloys; metal-based oxides such as $SnO$, $SnO_2$, $PbO$, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ a conductive polymer such as polyacetylene Li—Co—Ni based materials and the like.

If necessary, a conductive material, a filler, and the like may be further added to the anode mixture of the one embodiment.

The conductive material is used to impart conductivity to the anode, and the conductive material can be used without particular limitation as long as it has high conductivity without causing a chemical change in the battery to be configured, and for example, the conductive materials, including carbon-based materials such as natural graphite, artificial graphite, carbon black, acetylene black, ketjen black, or carbon fiber; metal-based materials, such as metal powder or metal fibers such as copper, nickel, aluminum and silver; a conductive polymer such as a polyphenylene derivative, or a mixture thereof, can be used.

The filler is optionally used as a component to suppress anode expansion. The filler is not particularly limited so long as it is a fibrous material that does not cause a chemical change in the corresponding battery. Examples of the filler include olefin-based polymers such as polyethylene and polypropylene; and fibrous materials such as glass fiber and carbon fiber.

Secondary Battery

In yet another embodiment of the present disclosure, a secondary battery including the anode of the one embodiment described above is provided. Such a secondary battery may be in the form of containing a cathode, an electrolyte and an anode, and can be implemented as a lithium secondary battery.

The lithium secondary battery can be manufactured by impregnating an electrode assembly including a cathode, a separator, and an anode with a non-aqueous electrolyte.

Anode

The anode can be manufactured by applying the anode mixture according to the above-mentioned one embodiment onto the anode current collector, followed by drying and rolling.

The anode current collector is generally formed to a thickness of 3 μm to 500 μm. Such an anode current collector is not particularly limited as long as it has high conductivity without causing chemical changes to the corresponding battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the anode current collector may have fine irregularities formed on the surface thereof to enhance the bonding strength of the anode active material, and it can be used in various forms such as a film, a sheet, a foil, a net, a porous body, a foaming body, and a non-woven fabric structure Cathode The cathode includes a cathode active material, and the cathode active material may be a layered compound such as lithium cobalt oxide ($LiCoO_2$), lithium nickel oxide ($LiNiO_2$) and a compound substituted with one or more transition metals; lithium manganese oxides such as chemical formula $Li_{1+x}Mn_{2-x}O_4$ (where, x is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, and $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like, but is not limited thereto.

The cathode current collector is generally formed to a thickness of 3 μm to 500 μm. The cathode current collector is not particularly limited so long it has conductivity without causing a chemical change in the corresponding battery, and for example, stainless steel, aluminum, nickel, titanium, sintered carbon, and a material formed by surface-treating a surface of aluminum or stainless steel surface with carbon, nickel, titanium, silver, or the like can be used. The current collector may have fine irregularities formed on a surface thereof to enhance the bonding strength of the cathode active material, and may be used in various forms such as a film, a sheet, a foil, a net, a porous body, a foaming body, and a non-woven fabric structure.

The conductive material is not particularly limited as long as it has conductivity without causing a chemical change in the corresponding battery, and for example, graphite such as natural graphite or artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whisker such as zinc oxide and potassium titanate; conductive metal oxides such as titanium oxide; conductive materials such as polyphenylene derivatives can be used.

A generally known binder may be used for the cathode. As typical example thereof, polyvinyl alcohol, carboxymethyl cellulose, hydroxypropylcellulose, diacetylcellulose, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, styrene-butadiene rubber, acrylate-butadiene rubber, epoxy resin, nylon, and the like can be used, but are not limited thereto.

The anode and the cathode are respectively manufactured by mixing an active material and a binder, optionally a conductive material, a filler, and the like in a solvent to produce an electrode mixture slurry, and then applying this electrode mixture slurry onto each electrode current collector. Since the above-mentioned electrode-manufacturing method is widely known in the art, a detailed description thereof will be omitted herein.

Separator

The separator separates the anode and the cathode, and provides a passage for lithium ions to move. Any separator may be used without particular limitation as long as it is generally used as a separator in a lithium secondary battery. That is, a separator having excellent moisture-retention ability for an electrolyte while having low resistance to the migration of electrolyte ions is preferable. For example, the separator is selected from glass fiber, polyester, Teflon, polyethylene, polypropylene, polytetrafluoroethylene (PTFE), or a combination thereof, and may be nonwoven fabric or woven fabric. For example, polyolefin-based polymer separator such as polyethylene and polypropylene are mainly used for lithium ion batteries, and in order to secure heat resistance or mechanical strength, a coated separator containing a ceramic component or a polymer material may be used, and optionally, a single layer or a multilayer structure may be used.

If necessary, a gel polymer electrolyte may be coated onto the separator to enhance the battery stability. Typical examples of such a gel polymer include polyethylene oxide, polyvinylidene fluoride, polyacrylonitrile, and the like.

However, when a solid electrolyte other than the non-aqueous electrolyte is used, the solid electrolyte can also serve as a separator.

Non-Aqueous Electrolyte

The non-aqueous electrolyte may be a liquid electrolyte containing a non-aqueous organic solvent and a lithium salt. The non-aqueous organic solvent functions as a medium through which ions involved in the electrochemical reaction of the battery can move.

As the non-aqueous electrolyte, a non-aqueous electrolyte solution, an organic solid electrolyte, an inorganic solid electrolyte and the like are used.

As examples of the non-aqueous electrolyte, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a material readily soluble in the non-aqueous electrolyte, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, lithium chloroborane, lithium lower aliphatic carboxylate, lithium tetraphenyl borate, and the like can be used.

In addition, for the purpose of improving charge/discharge characteristics, flame retardancy, and the like, for example, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride or the like may be further added to the electrolyte solution. If necessary, a halogen-containing solvent such as carbon tetrachloride or ethylene trifluoride may be further included in order to impart incombustibility, carbon dioxide gas may be further included in order to improve high-temperature storage characteristics, and FEC (fluoro-ethylene carbonate), PRS (propene sultone), FPC (fluoro-propylene carbonate), and the like may be further included.

Usage

The lithium secondary battery according to the present disclosure not only can be used for a battery cell used as a power source for a small device, but also can be used as a unit battery for a medium and large-sized battery module including a plurality of battery cells.

Hereinafter, preferred examples are presented to aid understanding of the present disclosure. However, the following examples are for illustrative purposes only and are not intended to limit the scope of the invention.

EXAMPLE

Example 1

(1) Preparation of Binder Composition for Anode

Polymerization was performed in two steps to prepare a binder particle having a core-shell structure.

1) First Step: Preparation of Isoprene-Based Core Particle (A) isoprene (200 parts by weight), (b) styrene (150 parts by weight), (c) acrylic acid and itaconic acid (26 parts by weight), sodium polyoxyethylene lauryl ethersulfate (2 parts by weight) as an emulsifier, and potassium persulfate (4 parts by weight) as a polymerization initiator were added to water as a solvent to prepare a first monomer mixture.

The temperature of the first monomer mixture was raised to 75° C., and then polymerization was performed for about 5 hours while maintaining 75° C. to obtain a core composition including isoprene-based core particles and water.

2) Second Step: Formation of Butadiene Shell

Specifically, (d) butadiene (59 parts by weight), (e) styrene (33 parts by weight), (f) acrylic acid and itaconic acid (8 parts by weight), sodium polyoxyethylene lauryl ether sulfate (0.6 parts by weight) as an emulsifier, and potassium persulfate (1.2 parts by weight) as a polymerization initiator were added to water as a solvent to prepare a second monomer mixture.

The second monomer mixture was taken in such an amount that the weight ratio of the first monomer mixture: the second monomer mixture was 9:1, and put into the first monomer mixture.

Then, the polymerization reaction was performed for about 5 hours while maintaining 75° C. to finally obtain a binder composition containing a binder (latex) particle containing an isoprene-based core particle and a butadiene-based shell, and water.

(2) Preparation of Anode Mixture Composition

Artificial graphite (95 parts by weight) as an anode active material, acetylene black (1.5 parts by weight) as a conductive material, the binder composition of Example 1 (2.0 parts by weight, in which the solid content was 40 wt. %) and carboxymethyl cellulose (1.5 parts by weight) as a thickener were used. These were stirred and mixed in water as a dispersion medium for 1 hour. At this time, the slurry phase was adjusted so that the total solid content was 50 wt. % to obtain the anode mixture composition of Example 1.

(3) Manufacture of Anode

A copper foil having a thickness of 10 μm was prepared, and used as an anode current collector. The anode mixture composition of Example 1 was applied to both sides in a loading amount of 8.0 mg/cm² per surface of the anode current collector using a comma coater, and dried by a hot air in an oven at 80° C. for 10 minutes, and then roll-pressed so that the total thickness was 190 Thereby, the anode of Example 1 was obtained.

(4) Manufacture of Secondary Battery 90 parts by weight of $Li_{1.03}Ni_{0.6}Co_{0.6}Mn_{0.2}O_2$ as a cathode active material, 5.0 parts by weight of acetylene black as a conductive material, and 50 parts by weight (10% solid content) of polyvinylidene fluoride (PVdF) as a binder were used. These were stirred and mixed in NMP as a solvent for 1 hour. At this time, the slurry phase was adjusted so that the total solid content was 70 wt. %. Thereby, the cathode mixture composition of Example 1 was obtained.

An aluminum foil having a thickness of 20 μm was prepared, and used as a cathode current collector. The cathode mixture composition of Example 1 was applied to both sides in a loading amount of 15.6 mg/cm$^2$ per surface of the anode current collector using a comma coater, and dried by a hot air in an oven at 80° C. for 10 minutes, and then roll-pressed so that the total thickness was 190 Thereby, the cathode of Example 1 was obtained.

A separator was inserted and assembled between the anode and the cathode of Example 1, and then an electrolyte solution was injected thereto to complete a lithium ion battery according to a method known in the art.

As the electrolyte solution, a solution, in which LiPF$_6$ was dissolved in a mixed solvent of ethylene carbonate (EC), propylene carbonate (PC) and diethyl carbonate (DEC) (weight ratio of EC:PC:DEC=3:2:5) so as to have a concentration of 1.3M, and fluoroethylene carbonate (FEC) was added so as to occupy 10 wt. % of the total weight of the electrolyte solution, was used.

Example 2

The binder composition for anode, the anode mixture composition, the anode and the secondary battery of Example 2 were manufactured by the same method as in Example 1, except that the weight ratio of the first monomer mixture and the second monomer mixture was changed.

Specifically, in Example 2, the formulation of the first monomer mixture and the formulation of the second monomer mixture were the same, but the weight ratio of the first monomer mixture:the second monomer mixture was changed to 6:1.

Example 3

The binder composition for anode, the anode mixture composition, the anode and the secondary battery of Example 3 were manufactured by the same method as in Example 1, except that the weight ratio of the first monomer mixture and the second monomer mixture was changed.

Specifically, in Example 3, the formulation of the first monomer mixture and the formulation of the second monomer mixture were the same, but the weight ratio of the first monomer mixture:the second monomer mixture was changed to 4.5:1.

Example 4

The binder composition for anode, the anode mixture composition, the anode and the secondary battery of Example 3 were manufactured by the same method as in Example 1, except that the formulation ratio of the first monomer mixture was changed.

Specifically, in Example 4, the formulation of the second monomer mixture and the weight ratio of the first monomer mixture:the second monomer mixture were the same, but in the preparation of the first monomer mixture, (a) isoprene (150 parts by weight), (b) styrene (200 parts by weight), and (c) acrylic acid and itaconic acid (26 parts by weight) were used.

Example 5

The binder composition for anode, the anode mixture composition, the anode and the secondary battery of Example 4 were manufactured by the same method as in Example 1, except that the formulation ratio of the first monomer mixture was changed.

Specifically, in Example 5, the formulation of the second monomer mixture and the weight ratio of the first monomer mixture:the second monomer mixture were the same, but in the preparation of the first monomer mixture, (a) isoprene (250 parts by weight), (b) styrene (200 parts by weight), and (c) acrylic acid and itaconic acid (26 parts by weight) were used.

Example 6

The binder composition for anode, the anode mixture composition, the anode and the secondary battery of Example 6 were manufactured by the same method as in Example 1, except that the formulation ratio of the second monomer mixture was changed.

Specifically, in Example 6, the formulation of the second monomer mixture and the weight ratio of the first monomer mixture:the second monomer mixture were the same, but in the preparation of the second monomer mixture, (d) butadiene (40 parts by weight), (e) styrene (52 parts by weight), and (f) acrylic acid and itaconic acid (8 parts by weight) were used.

Example 7

The binder composition for anode, the anode mixture composition, the anode and the secondary battery of Example 7 were manufactured by the same method as in Example 1, except that the formulation ratio of the second monomer mixture was changed.

Specifically, in Example 7, the formulation of the first monomer mixture and the weight ratio of the first monomer mixture:the second monomer mixture were the same, but in the preparation of the second monomer mixture, (d) butadiene (72 parts by weight), (e) styrene (20 parts by weight), and (f) acrylic acid and itaconic acid (8 parts by weight) were used.

Comparative Example 1

Only up to the first step of Example 1 was performed to prepare a composition containing an isoprene-based latex particle and water, which was used as the binder composition for anode of Comparative Example 1.

The anode mixture composition, the anode and the secondary battery of Comparative Example 1 were manufactured by the same method as in Example 1, except that the binder composition for anode was changed.

Comparative Example 2

The first step of Example 1 was omitted and only the second step was performed to prepare a composition containing a butadiene-based latex particle and water, which was used as the binder composition for anode of Comparative Example 2.

The anode mixture composition, the anode and the secondary battery of Comparative Example 2 were manufactured by the same method as in Example 1, except that the binder composition for anode was changed.

Comparative Example 3

The second monomer mixture of Example 1 was used in the preparation of the core particle, and the first monomer mixture of Example 1 was used in the formation of the shell to prepare a composition containing latex particles including a butadiene-based core particle and an isoprene-based shell, and water, which was used as the binder composition for anode of Comparative Example 3.

The anode mixture composition, the anode and the secondary battery of Comparative Example 3 were manufactured by the same method as in Example 1, except that the binder composition for anode was changed.

Comparative Example 4

The second monomer mixture of Example 1 was used in the preparation of the core particles, and the second monomer mixture of Example 1 was used even in the formation of the shell to prepare a composition containing latex particles including a butadiene-based core particle and butadiene-based shell and water, which was used as the binder composition for anode of Comparative Example 4.

The anode mixture composition, the anode and the secondary battery of Comparative Example 4 were manufactured by the same method as in Example 1, except that the binder composition for anode was changed.

Comparative Example 5

The first monomer mixture of Example 1 was used in the preparation of the core particle, and the first monomer mixture of Example 1 was used even in the formation of the shell to prepare a composition containing latex particles including an isoprene-based core particle and an isoprene-based shell and water, which was used as the binder composition for anode of Comparative Example 5.

The anode mixture composition, the anode and the secondary battery of Comparative Example 5 were manufactured by the same method as in Example 1, except that the binder composition for anode was changed.

For Examples 1 to 4 and Comparative Examples 1 to 5, the formulation of the monomer mixture used in the preparation of the core, the formulation of the monomer mixture used in the formation of the shell, and the weight ratio of the core monomer mixture and the shell monomer mixture are summarized in Table 1.

TABLE 1

| | Core | | | Shell | | | |
| --- | --- | --- | --- | --- | --- | --- | --- |
| | isoprene (part by weight) | styrene (part by weight) | acrylic acid and itaconic acid (part by weight) | butadiene (part by weight) | styrene (part by weight) | acrylic acid and itaconic acid (part by weight) | weight ratio of core:shell |
| Example 1 | 200 | 150 | 26 | 59 | 33 | 8 | 9:1 |
| Example 2 | 200 | 150 | 26 | 88.5 | 49.5 | 12 | 6:1 |
| Example 3 | 200 | 150 | 26 | 118 | 66 | 16 | 4.5:1 |
| Example 4 | 150 | 200 | 26 | 59 | 33 | 8 | 9 |
| Example 5 | 250 | 200 | 26 | 59 | 33 | 8 | 9 |
| Example 6 | 200 | 150 | 26 | 40 | 52 | 8 | 9 |
| Example 7 | 200 | 150 | 26 | 72 | 20 | 8 | 9 |
| Comparative Example 1 | 200 | 150 | 26 | — | — | — | — |
| Comparative Example 2 | — | — | — | 59 | 33 | 8 | — |

| | butadiene (part by weight) | styrene (part by weight) | acrylic acid and itaconic acid (part by weight) | isoprene (part by weight) | styrene (part by weight) | acrylic acid and itaconic acid (part by weight) | |
| --- | --- | --- | --- | --- | --- | --- | --- |
| Comparative Example 3 | 59 | 33 | 8 | 200 | 150 | 26 | 9:1 |

TABLE 1-continued

| | butadiene (part by weight) | styrene (part by weight) | acrylic acid and itaconic acid (part by weight) | butadiene (part by weight) | styrene (part by weight) | acrylic acid and itaconic acid (part by weight) | |
|---|---|---|---|---|---|---|---|
| Comparative Example 4 | 59 | 33 | 8 | 59 | 33 | 8 | 9:1 |

| | isoprene (part by weight) | styrene (part by weight) | acrylic acid and itaconic acid (part by weight) | isoprene (part by weight) | styrene (part by weight) | acrylic acid and itaconic acid (part by weight) | |
|---|---|---|---|---|---|---|---|
| Comparative Example 5 | 200 | 150 | 26 | 200 | 150 | 26 | 9:1 |

Experimental Example 1

Each binder composition of Examples 1 to 7 and Comparative Examples 1 to 5 was evaluated by the following method. The results are shown in Table 2 below.

1) Each of the binders can have the form of latex particles prepared by emulsion polymerization. For the latex particles, the arithmetic average particle size of the binder particles in the binder composition, specifically, the average particle size of the intensity distribution was determined using a particle size analyzer (NICOMP AW380, manufactured by PSS).

2) For the viscosity of the latex, Brookfield viscometer LV type and spindle #1 were used, and the viscosity values were taken as stable values after the lapse of 1 minute or more at 70 rpm.

TABLE 2

| | Average particle size (nm) | Viscosity (cP) |
|---|---|---|
| Example 1 | 187 | 21 |
| Example 2 | 211 | 21 |
| Example 3 | 278 | 21 |
| Example 4 | 178 | 20 |
| Example 5 | 224 | 21 |
| Example 6 | 182 | 20 |
| Example 7 | 175 | 20 |
| Comparative Example 1 | 105 | 20 |
| Comparative Example 2 | 82 | 20 |
| Comparative Example 3 | 180 | 21 |
| Comparative Example 4 | 161 | 20 |
| Comparative Example 5 | 256 | 21 |

Each anode and secondary battery of Examples 1 to 7 and Comparative Examples 1 to 2 were evaluated under the following conditions, and the results are reported in Table 3 below.

(1) Anode Adhesive Strength: The peel strength was measured 5 times or more for each anode of Examples and Comparative Examples, and then the average values were calculated. The average values are shown in Table 2 below.

Here, the peel strength is a measurement of the force(N) required to peel the tape from the anode at a peeling angle of 180° after attaching the anode to an adhesive tape having a width of 10 mm using a tension meter (Stable Micro System, TA-XT).

(2) Measurement of Electrolyte Solution Swelling Degree (Electrolyte Uptake)

The degree of swelling of the binder with respect to the electrolyte solution was measured. A binder dispersed in a solvent was applied onto a PET film to a certain thickness, dried at 80° C. for 24 hours or more, and then the binder film was cut into 1.5 cm*8 cm to prepare a specimen. The prepared specimen was supported in the electrolyte solution for 24 hours, and the weight before and after supporting the electrolyte solution was measured, respectively, and the binder weight change rate was evaluated according to the following [Equation 1].

Here, as the electrolyte solution, an electrolyte solution having the same composition as that used at the time of manufacturing each lithium ion battery was used.

Electrolyte solution uptake (%)=100×[Weight after supporting electrolyte solution]/[Weight before supporting electrolyte solution]   [Equation 1]

(3) Capacity retention rate of secondary battery after 300 cycles: In a constant temperature chamber at 25° C., the charge/discharge current density of each lithium secondary battery was set to 1 C, and charged in a CC/CV mode until it reached 4.3 V and then discharged in a CC mode until it reached 2.5 V. Such process was set to one cycle, and a 20-minute rest period was set between the charging and the discharging, and a total of 300 cycles were performed. The ratio of the discharge capacity measured in the 300th cycle relative to the discharge capacity measured in the first cycle was calculated.

TABLE 3

| | Anode adhesive strength (gf/cm) | Electrolyte solution uptake (%) | Capacity retention rate of secondary battery after 300 cycles (%) |
|---|---|---|---|
| Example 1 | 20.8 | 90 | 92 |
| Example 2 | 22.5 | 105 | 88 |
| Example 3 | 23.5 | 114 | 88 |

TABLE 3-continued

|  | Anode adhesive strength (gf/cm) | Electrolyte solution uptake (%) | Capacity retention rate of secondary battery after 300 cycles (%) |
|---|---|---|---|
| Example 4 | 20.8 | 101 | 89 |
| Example 5 | 20.7 | 82 | 93 |
| Example 6 | 18.5 | 90 | 92 |
| Example 7 | 21.9 | 91 | 91 |
| Comparative Example 1 | 12.2 | 92 | 87 |
| Comparative Example 2 | 21.0 | 125 | 86 |
| Comparative Example 3 | 16.4 | 120 | 86 |
| Comparative Example 4 | 22 | 123 | 86 |
| Comparative Example 5 | 12.5 | 90 | 92 |

Referring to Table 3, it can be confirmed that the anode adhesive strength, the electrolyte solution impregnation rate, and the capacity retention rate after 300 cycles of Examples 1 to 7 were excellent as a whole as compared with Comparative Examples 1 to 5.

Specifically, it is confirmed that in Comparative Example 1 in which isoprene-based particles are used as a binder, the change in weight before and after supporting the electrolyte solution is at a small level, but the initial adhesive strength of the anode was only 12.2 gf/cm.

Even in Comparative Example 5 in which latex particles including an isoprene-based core particle and an isoprene-based shell are used as the binder, it exhibits the results similar to those of Comparative Example 1 in which isoprene-based particles are used as a binder.

In this regard, it is inferred that the impregnation of the electrolyte solution can be suppressed through the isoprene-based latex particles, but it is insufficient to strengthen the initial adhesive strength of the anode, which will cause deintercalation of the anode during long-term driving of the secondary battery, thereby adversely affecting cycle characteristics.

It is confirmed that in Comparative Example 2 in which butadiene-based latex particles were used as a binder, the initial adhesive strength of the anode is secured, but the change in weight before and after supporting the electrolyte solution is as extreme as 125%.

Even in Comparative Example 4, in which latex particles including butadiene-based core particles and butadiene-based shells were used as a binder, it exhibits results similar to those of Comparative Example 2 in which butadiene-based latex particles are used as a binder.

At the laboratory scale, it was evaluated up to 300 cycles, but when driven for a long period of time beyond this, it is expected that the butadiene-based particles impregnated with the electrolyte solution further lose binding force to the anode active material according to the contraction and expansion of the anode active material, which will impair the cycle characteristics of the secondary battery.

On the other hand, in Comparative Example 3 in which latex particles including a butadiene-based core particle and an isoprene-based shell are used as a binder, the initial adhesive strength of the anode is partially improved as compared with Comparative Example 1, and the change in weight before and after supporting the electrolyte solution remains at a level that is partially improved as compared with Comparative Example 2.

In contrast, it is confirmed that in Examples 1 to 7 in which latex particles including an isoprene-based core particle and a butadiene-based shell are used as a binder, an initial adhesive strength of 18 gf/cm or more is secured and at the same time, the electrolyte solution impregnation rate is lowered to a level of 115% or less, and a capacity retention rate after 300 cycles can be secured to 88% or more.

In this regard, it can be seen that isoprene-based latex particles that inhibit electrolyte solution impregnation is used as a core, and a butadiene-based shell having excellent adhesive strength is formed on the surface thereof, whereby all of these advantages can be taken.

In addition to the description of the one embodiment, the formulation of the core (first monomer mixture), the formulation of the shell (second monomer mixture), and the weight ratio of core:shell (first monomer mixture:second monomer mixture) are controlled with reference to the examples of Examples 1 to 7, whereby the initial adhesive strength and impregnation rate of the anode, and furthermore, the lifespan of the secondary battery can also be adjusted to the desired range.

The invention claimed is:

1. A binder for an anode of a secondary battery, the binder comprising:
    a binder particle having a core-shell structure,
    wherein the binder particle comprises a copolymer core particle containing a first repeating unit derived from an isoprene-based first monomer; and a copolymer shell located on the surface of the core particle and containing a fourth repeating unit derived from a butadiene-based fourth monomer.

2. The binder for an anode of a secondary battery according to claim 1, wherein:
    the copolymer core particle further comprises,
    (b) a second repeating unit derived from an aromatic vinyl-based second monomer, and
    (c) a third repeating unit derived from an unsaturated carboxylic acid-based third monomer.

3. The binder for an anode of a secondary battery according to claim 2,
    which comprises, based on the total weight (100% by weight) of the copolymer core particle,
    (a) 30 to 65% by weight of the first repeating unit derived from the isoprene-based first monomer,
    (b) 30 to 65% by weight of the second repeating unit derived from the aromatic vinyl-based second monomer, and
    (c) 0.1 to 10% by weight of the third repeating unit derived from the unsaturated carboxylic acid-based third monomer.

4. The binder for an anode of a secondary battery according to claim 2, wherein:
    the aromatic vinyl-based second monomer is
    at least one selected from the group consisting of styrene, α-methylstyrene, β-methylstyrene, p-t-butylstyrene, chlorostyrene, vinylbenzoic acid, methyl vinylbenzoate, vinyl naphthalene, chloromethyl styrene, hydroxymethylstyrene and divinylbenzene.

5. The binder for an anode of a secondary battery according to claim 2, wherein:
    the third unsaturated carboxylic acid-based monomer is
    at least one selected from the group consisting of acrylic acid, methacrylic acid, maleic acid, fumaric acid, glutaric acid, itaconic acid, tetrahydrophthalic acid, crotonic acid, isocrotonic acid, and nadic acid.

6. The binder for an anode of a secondary battery according to claim 1, wherein:
the copolymer shell further comprises,
(e) a fifth repeating unit derived from an aromatic vinyl-based fifth monomer, and
(f) a sixth repeating unit derived from an unsaturated carboxylic acid-based sixth monomer.

7. The binder for an anode of a secondary battery according to claim 6,
which comprises, based on the total weight (100% by weight) of the copolymer shell,
(d) 30 to 85% by weight of the fourth repeating unit derived from the butadiene-based fourth monomer,
(e) 10 to 65% by weight of the fifth repeating unit derived from the aromatic vinyl-based fifth monomer, and
(f) 0.1 to 15% by weight of the sixth repeating unit derived from the unsaturated carboxylic acid-based sixth monomer.

8. The binder for an anode of a secondary battery according to claim 6, wherein:
the aromatic vinyl-based fifth monomer is
at least one selected from the group consisting of styrene, α-methylstyrene, β-methylstyrene, p-t-butylstyrene, chlorostyrene, vinylbenzoic acid, methyl vinylbenzoate, vinyl naphthalene, chloromethyl styrene, hydroxymethylstyrene and divinylbenzene.

9. The binder for an anode of a secondary battery according to claim 6, wherein:
the unsaturated carboxylic acid-based sixth monomer is
at least one selected from the group consisting of acrylic acid, methacrylic acid, maleic acid, fumaric acid, glutaric acid, itaconic acid, tetrahydrophthalic acid, crotonic acid, isocrotonic acid, and nadic acid.

10. The binder for an anode of a secondary battery according to claim 1, wherein:
a weight ratio of the copolymer core particle and the copolymer shell (core:shell) is 1:1 to 15:1.

11. The binder for an anode of a secondary battery according to claim 1, wherein:
the binder particle is a latex particle having an average particle size of 90 to 500 nm.

12. The binder for an anode of a secondary battery according to claim 1,
which further comprises an aqueous solvent.

13. The binder for an anode of a secondary battery according to claim 12, wherein:
the aqueous solvent is contained in an amount of 50 to 1,000 parts by weight, based on 100 parts by weight of the binder particle.

14. A method for preparing a binder for an anode of a secondary battery, comprising the steps of:
polymerizing a first monomer mixture containing an isoprene-based first monomer to prepare a copolymer core particle containing a repeating unit derived from the isoprene-based first monomer; and
polymerizing a second monomer mixture containing a butadiene-based fourth monomer in the presence of the copolymer core particle to form a copolymer shell containing a repeating unit derived from the butadiene-based fourth monomer on the surface of the copolymer core particle.

15. The method for preparing a binder for an anode of a secondary battery according to claim 14, wherein:
the first monomer mixture further comprises
(b) an aromatic vinyl-based second monomer, and (c) an unsaturated carboxylic acid-based third monomer.

16. The method for preparing a binder for an anode of a secondary battery according to claim 14, wherein:
the second monomer mixture further comprises
(e) an aromatic vinyl-based fifth monomer, and (f) an unsaturated carboxylic acid-based sixth monomer.

17. The method for preparing a binder for an anode of a secondary battery according to claim 14, wherein:
the polymerization of the first monomer mixture and the polymerization of the second monomer mixture are each independently performed in the presence of an aqueous solvent, an emulsifier and a polymerization initiator.

18. An anode mixture comprising:
the binder for an anode of a secondary battery according to claim 1; and
an anode active material.

19. An anode of a secondary battery comprising:
an anode mixture layer containing the anode mixture of claim 18; and
an anode current collector.

20. A secondary battery comprising:
the anode of claim 19;
a cathode; and
an electrolyte.

* * * * *